(12) United States Patent
Lin et al.

(10) Patent No.: US 6,606,306 B1
(45) Date of Patent: Aug. 12, 2003

(54) SYSTEM AND METHOD FOR SUPPORTING A PLURALITY OF MEDIA CONFERENCES

(75) Inventors: Tien-Yi Lin, Fremont, CA (US); Steven Chow, San Carlos, CA (US); Joseph C. Harrow, San Ramon, CA (US); Ken J. Ju, Cupertino, CA (US); Son H. P. Le, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/465,235

(22) Filed: Dec. 15, 1999

(51) Int. Cl.$^7$ ............................................... H04L 12/16
(52) U.S. Cl. ...................... 370/261; 370/259; 379/202; 379/201; 348/15
(58) Field of Search ................................ 370/267, 260, 370/261, 262, 263, 264, 265, 266, 269, 352, 356; 379/201, 101, 202.01, 203.01; 709/230

(56) References Cited

U.S. PATENT DOCUMENTS

| | | | |
|---|---|---|---|
| 4,665,514 A | 5/1987 | Ching et al. | 370/60 |
| 4,771,425 A | 9/1988 | Baran et al. | 370/85 |
| 4,819,228 A | 4/1989 | Baran et al. | 370/85 |
| 4,903,261 A | 2/1990 | Baran et al. | 370/94.2 |
| 5,524,110 A | 6/1996 | Danneels et al. | 370/62 |
| 5,526,353 A | 6/1996 | Henley et al. | 370/60.1 |
| 5,841,763 A * | 11/1998 | Leondires | 370/260 |
| 6,181,786 B1 * | 1/2001 | Detampel | 379/205 |
| 6,226,678 B1 * | 5/2001 | Mattaway | 709/230 |
| 6,418,214 B1 * | 7/2002 | Smythe | 379/202.01 |

OTHER PUBLICATIONS

Cisco Systems, "System Description for the Cisco Communications Network," Version 2.1, 3 pages, Jan. 1999.

* cited by examiner

Primary Examiner—Douglas Olms
Assistant Examiner—Ricardo M. Pizarro
(74) Attorney, Agent, or Firm—Baker Botts L.L.P.

(57) ABSTRACT

A device for supporting a plurality of media conferences includes digital signal processors (DSPs) and a system resource management (SRM) module coupled to the DSPs. Each DSP receives input data packets from conference participants and processes the input data packets to generate output data packets. Each DSP determines whether the media conference is set to an active mode and communicates the output data packets to the conference participants in response to determining that the media conference is set to the active mode. The SRM module allocates a media conference to a first DSP and a second DSP and sets the media conference to the active mode in the first DSP and a stand-by mode in the second DSP. The first DSP communicates output data packets associated with the media conference in response to the SRM module setting the media conference to the active mode in the first DSP. The SRM module sets the media conference to the active mode in the second DSP and de-allocates the media conference from the first DSP, and the second DSP communicates output data packets associated with the media conference in response to the SRM module setting the media conference to the active mode in the second DSP.

24 Claims, 6 Drawing Sheets

| | MEDIA CONFERENCE | PARTICIPANTS | DSP SET TO ACTIVE MODE | DSP SET TO PASSIVE MODE | PROCESSING INFORMATION | MEMORY INFORMATION |
|---|---|---|---|---|---|---|
| | | 42 | 44 | 46 | 48 | 50 | 52 |
| | 1 | 15.2.48.147 163.45.87.2 222.154.2.14 | 1 | 2 | 25 | 30% |
| | 4 | 12.69.158.3 35.79.2.198 63.58.158.6 96.68.75.15 | 3 | NONE | 45 | 40% |
| | ⋮ | ⋮ | ⋮ | ⋮ | ⋮ | ⋮ |
| | 2 | 6.8.45.168 15.26.254.2 69.36.147.3 154.68.57.64 185.21.35.167 224.36.56.98 | 1 | 4 | 70 | 55% |

40

| MEDIA CONFERENCE | PARTICIPANTS | DSP SET TO ACTIVE MODE | DSP SET TO PASSIVE MODE | PROCESSING INFORMATION | MEMORY INFORMATION |
|---|---|---|---|---|---|
| 1 | 15.2.48.147<br>163.45.87.2<br>222.154.2.14 | 1 | 2 | 25 | 30% |
| 4 | 12.69.158.3<br>35.79.2.198<br>63.58.158.6<br>96.68.75.15 | 3 | NONE | 45 | 40% |
| ⋮ | ⋮ | ⋮ | ⋮ | ⋮ | ⋮ |
| 2 | 6.8.45.168<br>15.26.254.2<br>69.36.147.3<br>154.68.57.64<br>185.21.35.167<br>224.36.56.98 | 1 | 4 | 70 | 55% |

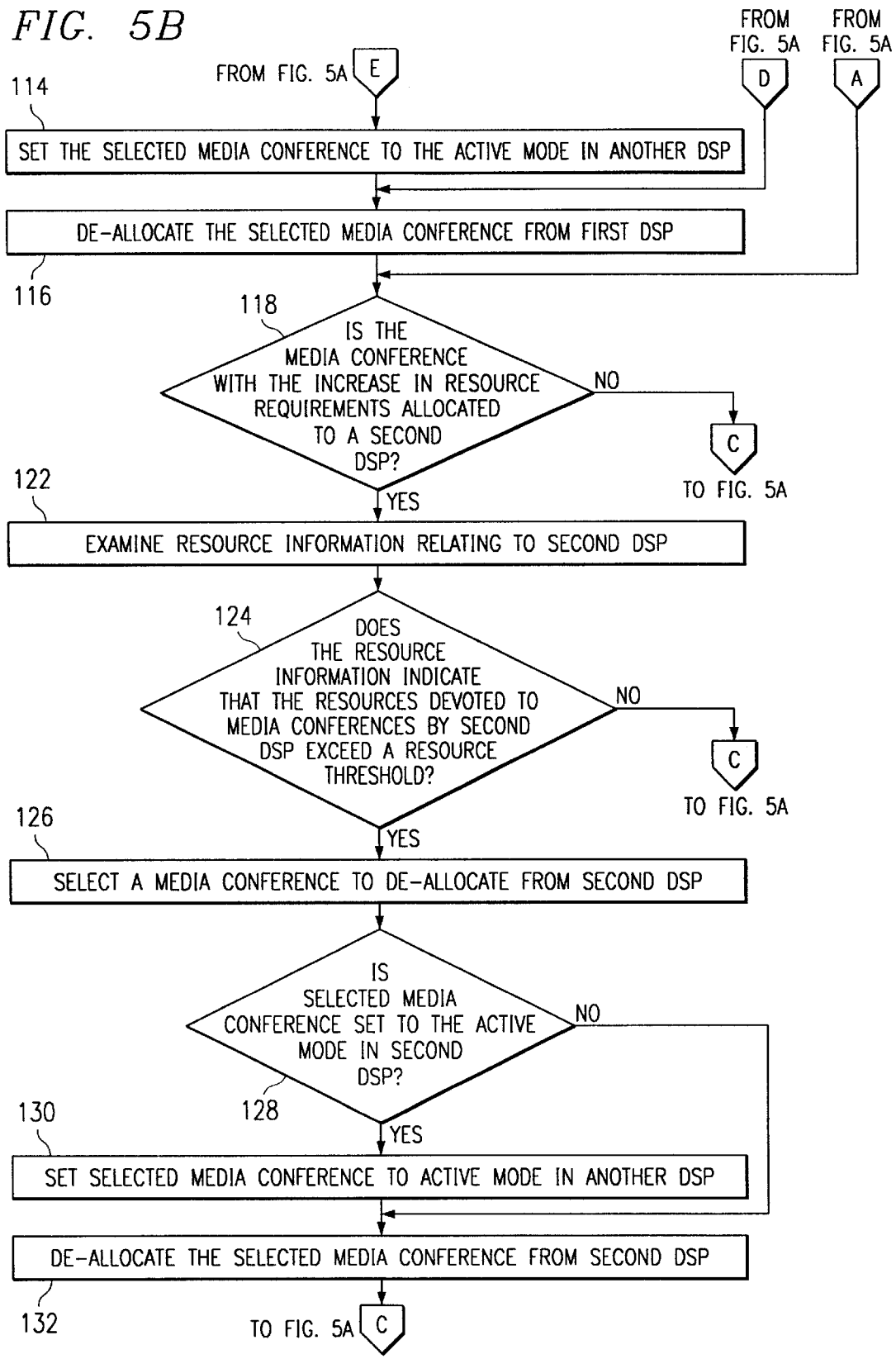

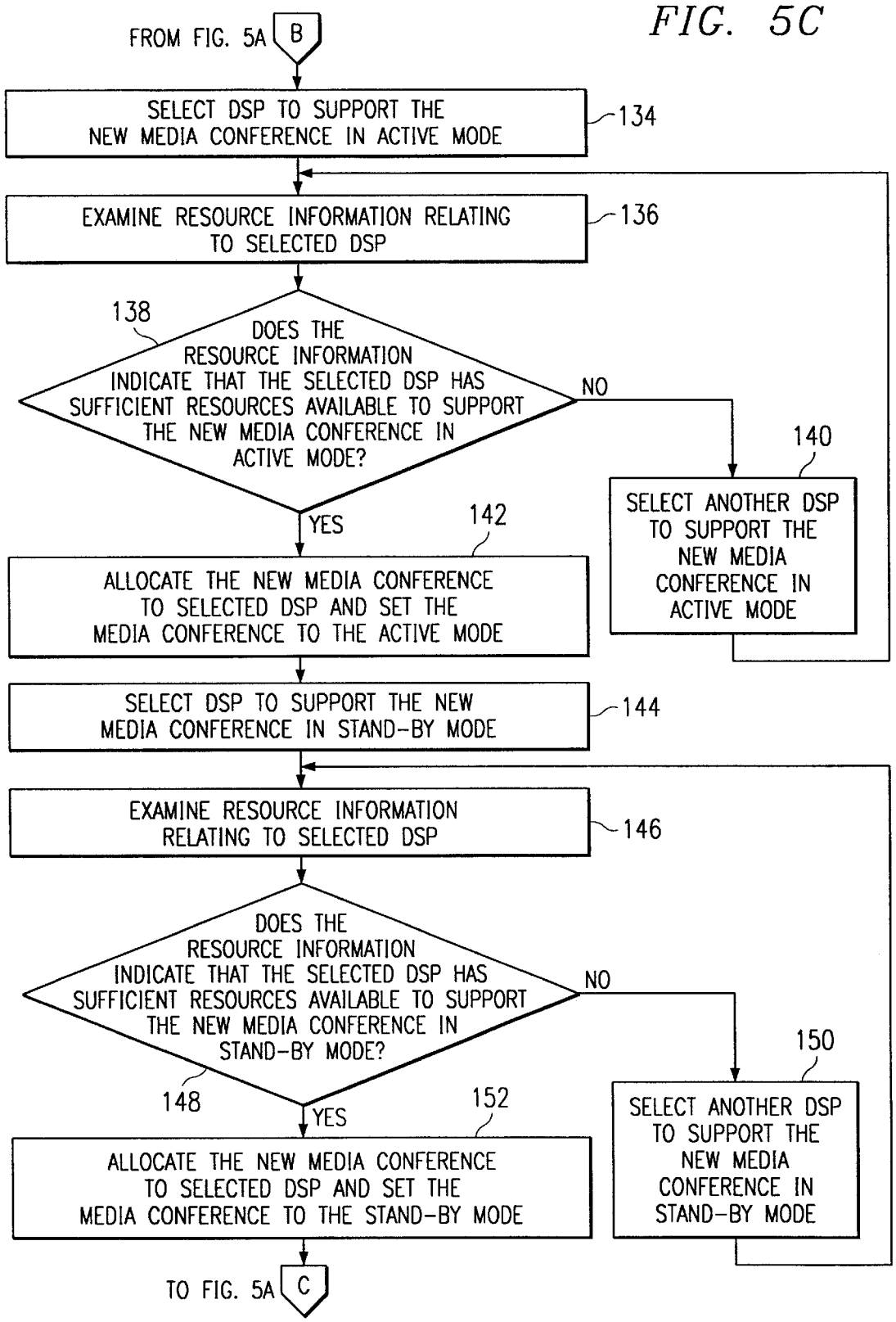

SYSTEM AND METHOD FOR SUPPORTING A PLURALITY OF MEDIA CONFERENCES

TECHNICAL FIELD OF THE INVENTION

This invention relates to the field of data processing and, more particularly, to a system and method for supporting a plurality of media conferences.

BACKGROUND OF THE INVENTION

Many hardware and software applications use digital signal processors (DSPs) to process real-time data communicated over packet-based networks. These applications typically receive input data packets from end-user devices, process the input data packets to generate output data packets, and communicate the output data packets to the end-user devices.

Unfortunately, applications that manipulate real-time data require a minimum amount of memory, processing, or other resources to appear transparent to users. Once the applications allocated to a DSP exhaust the DSP's available resources, current systems restrict the dynamic growth of the applications to prevent performance degradations. For example, devices that process media conferences do not allow media conferences to add new participants if the DSP supporting the media conferences lacks the available resources to support the new conference participants.

SUMMARY OF THE INVENTION

From the foregoing, a need has arisen for a system that supports the dynamic nature of many real-time applications, such as media conferencing In accordance with the present invention, a system and method for maintaining a plurality of media conferences is provided that substantially eliminates or reduces disadvantages or problems associated with previously developed systems and methods.

In one embodiment, a device for supporting a plurality of media conferences includes digital signal processors (DSPs) and a system resource management (SRM) module coupled to the DSPs. Each DSP receives input data packets from conference participants and processes the input data packets to generate output data packets. Each DSP determines whether the media conference is set to an active mode and communicates the output data packets to the conference participants in response to determining that the media conference is set to the active mode The SRM module allocates a media conference to a first DSP and a second DSP and sets the media conference to the active mode in the first DSP and a stand-by mode in the second DSP. The first DSP communicates output data packets associated with the media conference in response to the SRM module setting the media conference to the active mode in the first DSP. The SRM module sets the media conference to the active mode in the second DSP and de-allocates the media conference from the first DSP, and the second DSP communicates output data packets associated with the media conference in response to the SRM module setting the media conference to the active mode in the second DSP.

Technical advantages of the present invention include a system and method for supporting media conferences. A pool of DSPs processes media conferences, and a SRM module allocates media conferences to the DSPs and de-allocates media conferences from the DSPs according to the dynamic resource requirements of the media conferences. When the SRM receives a request to create a new media conference, the SRM allocates the media conference to two DSPs. The SRM module sets the media conference to an active mode in a first DSP and a stand-by mode in a second DSP. Because both DSPs are processing the media conference, the SRM module may later de-allocate the media conference from one of the two DSPs without substantial buffering or processing delays. The SRM module may de-allocate the media conference from one of the DSPs to free processing, memory, or other resources to support new media conferences or new participants in existing media conferences. For these and other readily apparent reasons, the present invention represents a significant advance over prior systems and methods.

BRIEF DESCRIPTION OF THE DRAWINGS

For a more complete understanding of the present invention, and further features and advantages, reference is now made to the following description, taken in conjunction with the accompanying drawings, in which:

FIGS. 5A, 5B, and 5C illustrate a flowchart of a method of supporting media conferences using two or more DSPs.

DETAILED DESCRIPTION OF THE DRAWINGS

Figure 1:
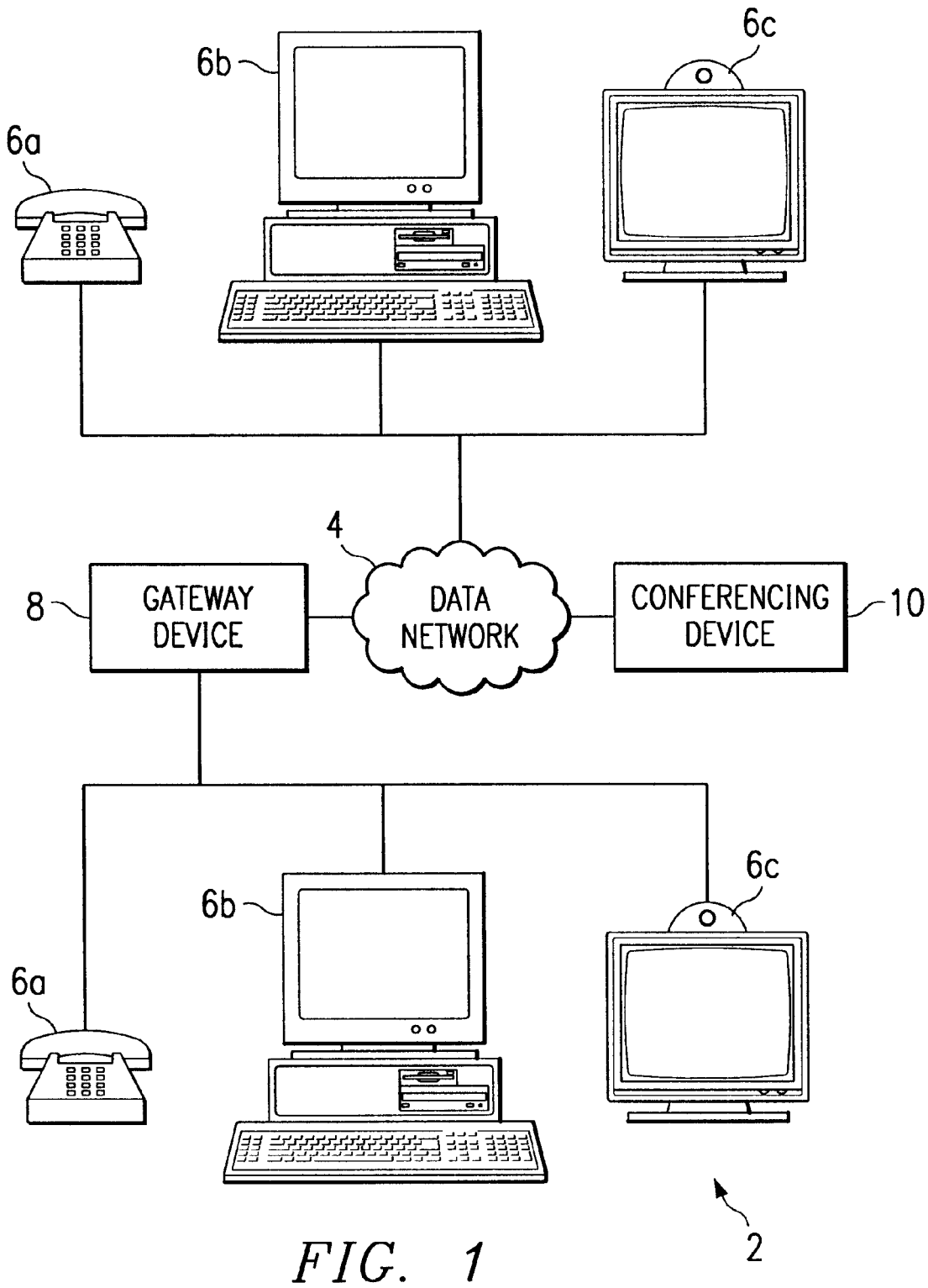
FIG. 1 illustrates a system that supports media conferences using a data network.

FIG. 1 illustrates a system 2 that supports media conferences using a data network 4. A media conference is a real-time or near real-time communication among three or more participants. During a media conference, a participant may share voice, image, picture, video, or other media information with other conference participants. To establish and maintain media conferences, system 2 includes data network 4, end-user devices 6a, 6b, and 6c (collectively, end-user devices 6), gateway device 8, and conferencing device 10. End-user devices 6 communicate data streams to conferencing device 10 and receive data streams from conferencing device 10 using data network 4. Conferencing device 10 receives input data streams from end-user devices 6, processes the input data streams to generate output data streams, and communicates the output data streams to end-user devices 6. As described in further detail below with reference to FIG. 2, digital signal processors (DSPs) in conferencing device 10 process the media conferences, and a system resource management (SRM) module in conferencing device 10 allocates the media conferences to the DSPs and de-allocates the media conferences from the DSPs according to the dynamic resource requirements of the media conferences.

End-user devices 6 provide a user interface for conference participants. Each end-user device 6 receives audio, visual, or other sensory input from a conference participant and, in response, generates voice, image, picture, video, or other media information. End-user device 6 communicates an input data stream including the media information to conferencing device 10 and receives from conferencing device 10 an output data stream that conferencing device 10 generates by processing input data streams received from other participants' end-user devices 6. Using voice, image, picture, video, or other media information from the output data stream, enduser device 6 produces audio, visual, or other sensory output for a conference participant. In a particular embodiment, end-user device 6 may be a telephone device 6a, a computer 6b, video conferencing equipment 6c, or any other suitable processing or communications device.

Data network 4 communicates data streams between end-user devices 6 and conferencing device 10. More specifically, data network 4 communicates data packets using an Internet protocol, an Ethernet protocol, an Asynchronous Transfer Mode (ATM) protocol, or any other suitable network protocol. Data network 4 may include a local-area network (LAN), a wide-area network (WAN), the Internet, or any other suitable packet-based network. In a particular embodiment, end-user devices 6 are coupled to data network 4 by wireless, wireline, or other suitable communication paths. End-user devices 6 communicate data streams to conferencing device 10 by encapsulating the data streams in data packets and communicating the data packets to data network 4. End-user devices 6 also receive data packets from data network 4 and process the data packets to reconstruct the output data streams generated by conferencing device 10.

In an alternative embodiment, a gateway device 8 links end-user devices 6 to data network 4. Gateway device 8 receives data streams from end-user devices 6, encapsulates the data streams in data packets, and communicates the data packets to conferencing device 10 using data network 4. Gateway device 8 also receives data packets from data network 4, processes the data packets to reconstruct the output data streams generated by conferencing device 10, and communicates the output data streams to end-user devices 6.

Figure 2:
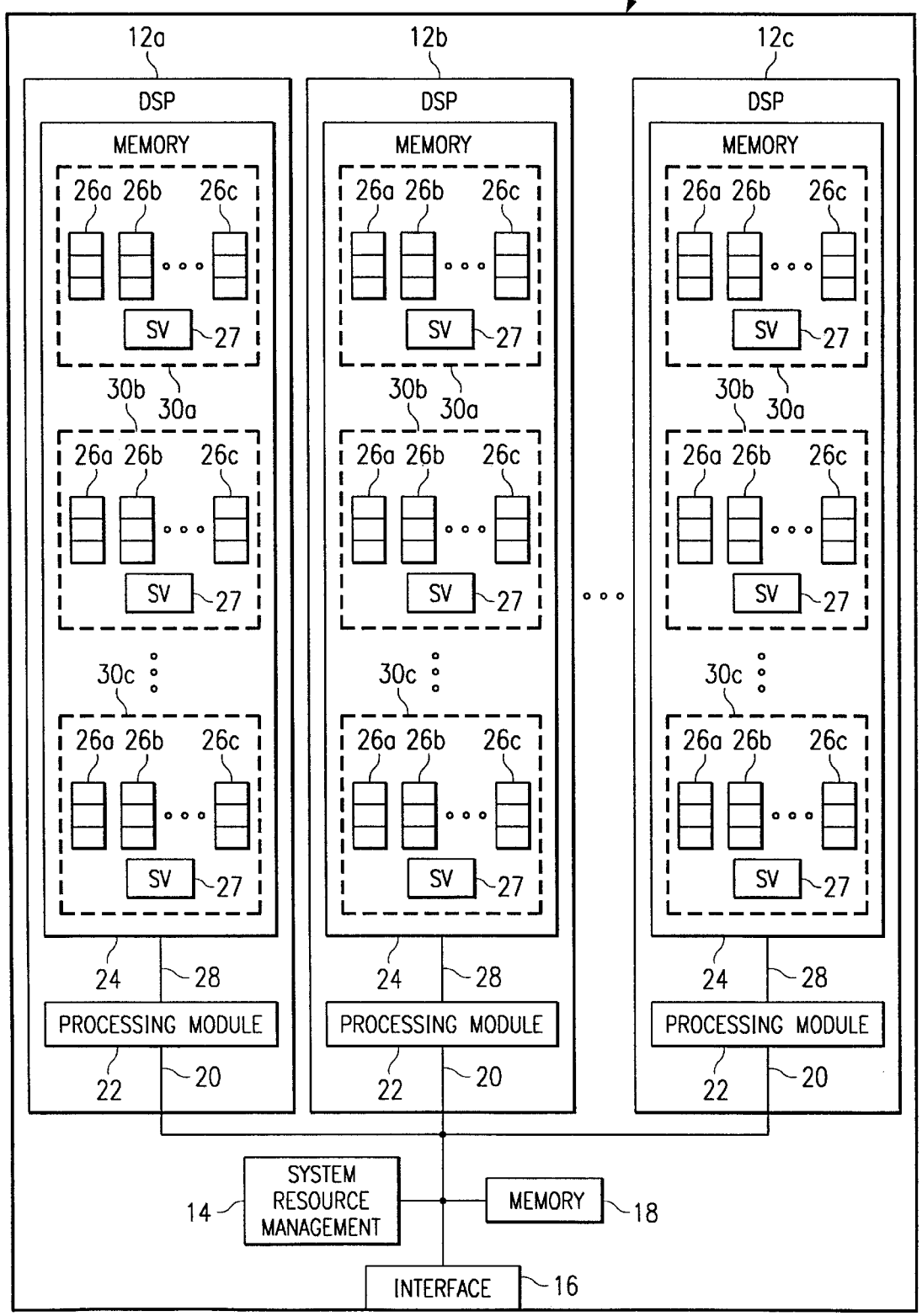
FIG. 2 illustrates a conferencing device for processing media conferences.

FIG. 2 illustrates a conferencing device 10 for processing media conferences. Conferencing device 10 may be either a stand-alone, networked device or a component operating in conjunction with a networked device. In a particular embodiment, conferencing device 10 is a circuit board coupled to a backplane within a networked, telecommunications device. Conferencing device 10 includes digital signal processors (DSPs) 12a, 12b, and 12c (collectively, DSPs 12), a system resource management (SRM) module 14, an interface 16, and a memory 18 coupled together by links 20. Links 20 may be shared or dedicated communication paths that support serial, parallel, or any other suitable form of communication. As described in further detail below, DSPs 12 process media conferences, and SRM module 14 allocates media conferences to DSPs 12 and de-allocates media conferences from DSPs 12 according to the dynamic resource requirements of the media conferences.

DSPs 12 receive data packets associated with a media conference, process the data packets to reconstruct one or more input data streams, process the input data streams to generate one or more output data streams, and, if the media conference is set to an active mode, communicate data packets encapsulating the output data streams to end-user devices 6 associated with the media conference. Each DSP 12 includes a processing module 22 and a memory 24. Memory 24 may include volatile memory, non-volatile memory, or both volatile and non-volatile memory. Although memory 24 appears internal to DSPs 12 in FIG. 2, memory 24 may be internal to or external from DSPs 12 according to particular needs.

In response to SRM module 14 allocating a media conference to DSP 12, processing module 22 creates a conference context for the media conference by devoting memory, processing, or other resources to the media conference. Processing module 22 may receive from SRM module 14 initiation information indicating a number of participants in the media conference and, in response, create in memory 24 one or more jitter buffers 26a, 26b, and 26c (collectively, buffers 26) for each participant. Once DSP 12 begins processing the media conference, processing module 22 will store in each buffer 26 data packets from an associated conference participant and will process the data packets stored in each buffer 26 to reconstruct an input data stream generated by the associated conference participant. Because DSP 12 may support more than one media conference at a time, memory 24 may include several groups 30a, 30b, and 30c (collectively, groups 30) of buffers 26, each group 30 associated with a separate media conference. In a particular embodiment, processing module 22 dynamically allocates memory 24 to create buffers 26 as DSP 12 receives data packets from conference participants.

When SRM module 14 allocates a media conference to DSP 12, processing module 22 may receive from SRM module 14 control information setting the media conference to an active mode or a stand-by mode. As described in further detail below, when a media conference is set to the active mode, processing module 22 generates output data streams associated with the media conference and communicates data packets encapsulating the output data streams to conference participants. In contrast, when a media conference is set to the stand-by mode, processing module 22 generates the output data streams but does not communicate the output data streams to conference participants. In response to receiving the control information, processing module 22 may store in memory 24 a status variable 27 associated with the media conference. Status variable 27 indicates whether the associated media conference is set to the active or stand-by mode. In a particular embodiment, when SRM module 14 allocates a media conference to DSP 12, processing module 22 by default sets the media conference to the active mode. In such an embodiment, SRM module 14 does not need to communicate control information to processing module 22 to set the media conference to the active mode, but SRM module 14 communicates control information to processing module 22 to set the media conference to the stand-by mode. Alternatively, processing module 22 may by default set an allocated media conference to the stand-by mode. During the processing of a media conference, processing module 22 may receive control information changing the setting of a media conference from the stand-by mode to the active mode or from the active mode to the stand-by mode, and in a particular embodiment, processing module 22 modifies status variable 27 associated with the media conference in memory 24 in response to receiving the control information.

After creating a conference context for a media conference, DSP 12 begins processing the media conference. Processing module 22 receives data packets associated with the conference participants and stores the data packets in buffers 26. To reconstruct the input data streams generated by each participant's end-user device 6, processing module 22 stores the received data packets associated with each conference participant in separate buffers 26. In a particular embodiment, processing module 22 receives a data packet from interface 16, examines the source address of the data packet, identifies one of buffers 26 associated with the source address, and stores the data packet in associated buffer 26. Because the source address of the data packet identifies end-user device 6 that generated the data packet, processing module 22 may use the source address to associate the data packet with a conference participant and to store the data packet in buffer 26 also associated with the conference participant.

To reconstruct the input data streams generated by end-user devices 6, processing module 22 re-sequences the received data packets. Because the data packets are transmitted individually over data network 4, the data packets may travel different paths from each end-user device 6 to conferencing device 10. As a result, although the data packets encapsulating each input data stream are typically transmitted sequentially from the same location, the data packets may arrive at conferencing device 10 out of order due to the different communication delays associated with the different communication paths. Thus, processing module 22 resequences the received data packets to reconstruct the input data streams generated by end-user devices 6. The received data packets include identifiers that indicate the proper order of the data packets associated with each conference participant. In a particular embodiment, either end-user devices 6 or gateway devices 8 sequentially number the data packets associated with each conference participant to allow processing module 22 to resequence data packets received out of order. When processing module 22 receives data packets, processing module 22 may store the data packets in buffers 26 in order of receipt and then later sort the data packets stored in buffers 26 according to the packet identifiers. Alternatively, when processing module 22 receives data packets, processing module 22 may initially stores the received data packets in buffers 26 in their proper sequence according to the packet identifiers of the already stored data packets. The latter embodiment avoids the need to later sort the data packets stored in buffers 26.

After re-sequencing the received data packets, processing module 22 may identify and regenerate missing data packets. By examining the identifiers of the resequenced data packets in buffers 26, processing module 22 can identify missing data packets. If processing module 22 does not receive a missing data packet within a threshold period of time, processing module 22 may regenerate the missing packet based on information included in preceding data packets, succeeding data packets, or both preceding and succeeding data packets. The threshold period of time allows processing module 22 a limited amount of time in which to receive any missing data packets without impairing the real-time quality of the media conference. After expiration of the threshold period of time, processing module 22 must continue processing the media conference without the missing packets to maintain the real-time quality of the media conference. In a particular embodiment, instead of regenerating missing data packets, processing module 22 inserts null packets in place of the missing data packets.

Processing module 22 retrieves data packets from buffers 26 and processes the data packets to generate one or more output data streams. First, processing module 22 retrieves data packets from buffers 26 and decodes, or linearizes, the data included in the packets to reconstruct input data streams. A data packet typically includes media information encoded in a format that facilitates efficient communication using data network 4. Processing module 22 decodes the data in the data packets to regenerate the encoded media information. For example, in a voice telephone conference, data packets may include voice information encoded according to various standard protocols, such as G.711, G.723, or G.729. In a particular embodiment, a data packet includes compressed data, and processing module 22 decompresses the data before decoding. Processing module 22 then mixes the media information from two or more input data streams associated with a media conference to produce one or more output data streams. In a particular embodiment of a voice telephone conference, processing module 22 produces separate output voice streams for each speaking participant: each speaking participant receives an output voice stream that includes a mix of the other participants' voices but not his or her own voice. Processing module 22 may encode the output data streams for each conference participant according to a coding format used by the participant's end-user device 6 or gateway device 8.

Processing module 22 determines whether the media conference is set to the active or stand-by mode, and if the media conference is set to the active mode, processing module 22 communicates the encoded output data streams to the conference participants' end-user devices 6. In a particular embodiment, processing module 22 retrieves status variable 27 associated with the media conference and examines status variable 27 to determine whether the media conference is set to the active mode. In response to determining that the media conference is set to the active mode, processing module 22 encapsulates the output data streams in output data packets and communicates the output data packets to interface 16 for further communication to data network 4.

SRM module 14 allocates media conferences to DSPs 12 and de-allocates media conferences from DSPs 12 according to the dynamic resource requirements of the media conferences. SRM module 14 may be implemented in hardware, software stored in a computer readable medium, or both hardware and software. In response to receiving a request to create a new media conference from interface 16, SRM module 14 selects two or more DSPs 12 for service and allocates the new media conference to selected DSPs 12 by communicating initiation information to selected DSPs 12. As described above, each DSP 12 creates a conference context for the new media conference using the initiation information. SRM module 14 sets the media conference to the active mode in one of selected DSPs 12 and sets the media conference to the stand-by mode in other selected DSPs 12. To set the media conference to the active mode or the stand-by mode in DSPs 12, SRM module 14 communicates to DSPs 12 control information indicating the setting of the media conference. After allocating the new media conference to selected DSPs 12, SRM module 14 receives data packets associated with the new media conference and communicates the data packets to selected DSPs 12. As explained above, each DSP 12 processes the data packets to generate output data streams, and DSP 12 that is processing the media conference in the active mode communicates the output data streams to the conference participants' end-user devices 6.

In a particular embodiment, SRM module 14 allocates new media conferences to DSPs 12 according to resource information relating to DSPs 12. Each DSP 12 must devote a minimum amount of memory, processing, or other resources to a media conference for the mixing of data streams to appear transparent or near transparent to conference participants. Otherwise, processing and buffering delays between the receipt of an input data packet and the communication of a corresponding output data packet degrade the quality of service below an acceptable threshold for media conferences. To avoid such a performance degradation, SRM module 14 may allocate new media conferences to DSPs 12 according to resource information relating to DSPs 12.

In response to selecting one of DSPs 12 for service, SRM module 14 examines resource information relating to selected DSP 12. The resource information may indicate the amount of resources that DSP 12 already has devoted to existing media conferences, or the resource information may indicate an amount of resources available at DSP 12 for processing the new media conference. SRM module 14 may receive the resource information from DSP 12, or SRM module 14 may generate the resource information based on status or other information stored in memory 18. As described in more detail below with reference to FIG. 3, memory 18 may store status, resource, or other information relating to the operation of conferencing device 10. In a particular embodiment, the resource information relates to processing resources, commonly measured in millions of instructions per second (MIPS), and SRM module 14 generates the resource information according to a number of media conferences allocated to DSP 12, a number of participants in each media conference, and the encoding formats used by the participants' end-user devices 6 or gateway devices 8. In such an embodiment, the SRM module 14 may generate the resource information by calculating the number of MIPS required to decode, mix, and encode the data streams associated with each participant in the media conferences allocated to DSP 12. Generally, encoding data streams requires more MIPS than decoding or mixing data streams. For example, processing module 22 may use only 5 MIPS to decode a G.729 data stream and to mix the decoded data stream with other data streams to generate an output data stream, but processing module 22 may need to devote 25 MIPS to encoding the output data stream according to G.729. By calculating the number of MIPS required to support each conference participant, SRM module 14 can generate resource information indicating the number of MIPS devoted to existing media conferences and the number of MIPS available to process new media conferences.

After examining the resource information, SRM module 14 determines whether selected DSP 12 has sufficient resources available to devote to the new media conference. If selected DSP 12 has sufficient available resources according to the resource information, then SRM module 14 may allocate the new media conference to selected DSP 12. Otherwise, SRM module 14 may allocate the new media conference to another DSP 12 with sufficient available resources. In a particular embodiment, SRM module 14 maintains at each DSP 12 a buffer of available resources so that each DSP 12 may process allocated media conferences in a real-time or near real-time manner even if the resource requirements of the media conferences fluctuate. In such an embodiment, SRM module 14 may allocate the new media conference to selected DSP 12 if doing so would not compromise the buffer of available resource at selected DSP 12.

In response to allocating the new media conference to selected DSP 12, SRM module 14 modifies the status, resource, or other information stored in memory 18 relating to selected DSP 12 and the new media conference. The status information stored in memory 18 relates to the allocation of media conferences among DSPs 12 in conferencing device 10. More specifically, the status information may associate the allocated media conferences with DSPs 12 that process the media conferences in the active or stand-by mode. The resource information relates to the utilization of processing, memory, and other resources by DSPs 12 to maintain the media conferences. A particular embodiment of the status and resource information is described in further detail below with reference to FIG. 3. Memory 18 may include volatile memory, non-volatile memory, or both volatile and non-volatile memory. Although memory 18 appears separate from SRM module 14 in FIG. 2, memory 18 may be internal to or external from SRM module 14 according to particular needs.

SRM module 14 may de-allocate media conferences from DSPs 12 to ensure that DSPs 12 can meet the changing resource requirements of the media conferences. As described above, each DSP 12 must devote a minimum amount of memory, processing, or other resources to a media conference for the real-time mixing of data streams to appear transparent to conference participants. The resource requirements of a media conference may increase over time. For example, a new participant may join the media conference, or an existing participant may change the coding format used by his or her end-user device 6, communicate additional media information to conferencing device 10, or take other actions that affects the resource requirements of the media conference. In response to an increase in the resource requirements of a media conference allocated to a first DSP 12a, SRM module 14 may de-allocate a media conference from first DSPs 12a to free processing, memory, or other resources to handle the increase in the resource requirements of the media conference.

SRM module 14 first selects a media conference to de-allocate from a first DSP 12a. Using status information stored in memory 18, SRM module 14 selects a media conference that is also allocated to a second DSP 12b. The selected media conference may be the media with the increase in resource requirements or may be another media conference allocated to first DSP 12a. SRM module 14 identifies second DSP 12b that is also processing the selected media conference. SRM module 14 then determines whether the media conference is set to the active mode in first DSP 12a and the stand-by mode in second DSP 12b or whether the media conference is set to the active mode in second DSP 12b and the stand-by mode in first DSP 12a.

If the media conference is set to the active mode in first DSP 12a and the stand-by mode in second DSP 12b, SRM module 14 sets the media conference to the active mode in second DSP 12b and de-allocates the media conference from first DSP 12a. When second DSP 12b was processing the media conference in the stand-by mode, second DSP 12b was generating output data streams associated with the media conference but not communicating the output data streams to the conference participants. After SRM module 14 sets the media conference to the active mode in second DSP 12b, second DSP 12b may begin communicating the output data streams to end-user devices 6 without undue buffering or processing delays. Thus, SRM module 14 does not interfere with the media conference by de-allocating the media conference from first DSP 12a.

If the media conference is set to the active mode in second DSP 12b and the stand-by mode in first DSP 12a, SRM module 14 may immediately de-allocate the media conference from first DSP 12a without changing the setting of the media conference in second DSP 12b. Because second DSP 12b is already actively processing the media conference, SRM module 14 will not interfere with the media conference by de-allocating the media conference set to the stand-by mode in first DSP 12a. In response to de-allocating the media conference from first DSP 12a, SRM module 14 may modify status, resource, or other information stored in memory 18 relating to first DSP 12a, second DSP 12b, and the media conference.

In a particular embodiment, SRM module 14 de-allocates a media conference from first DSP 12a according to resource information relating to first DSP 12a. As described above, SRM module 14 may receive resource information from first DSP 12a or may generate resource information based on status or other information stored in memory 18. SRM module 14 examines the resource information and, based on the resource information, determines whether to de-allocate a media conference from first DSP 12a. In a particular embodiment, SRM module 14 may examine the resource information in response to receiving a request to add a participant to a media conference allocated to first DSP 12a, and if the resource information indicates that first DSP 12a does not have sufficient resources available to support the new participant, SRM module 14 may de-allocate a media conference from first DSP 12a to free processing, memory, or other resources to support the new participant. Alternatively, SRM module 14 may maintain a buffer of available resources at first DSP 12a, and if the amount of resources devoted to existing media conferences exceeds a resource threshold or if the amount of available resources drops below a resource threshold, SRM module 14 may de-allocate a media conference from first DSP 12a to restore the buffer of available resources. SRM module 14 may evaluate the state of the resource buffer in response to adding a new participant to a media conference, changing a coding format used by a participant, or any other action that substantially affects the resource utilization of first DSP 12a. By de-allocating media conferences from DSPs 12 according to resource information, SRM module 14 improves resource utilization while allowing conferencing device 10 to adjust to the dynamic resource requirements of the media conferences.

Figures 3, 4:
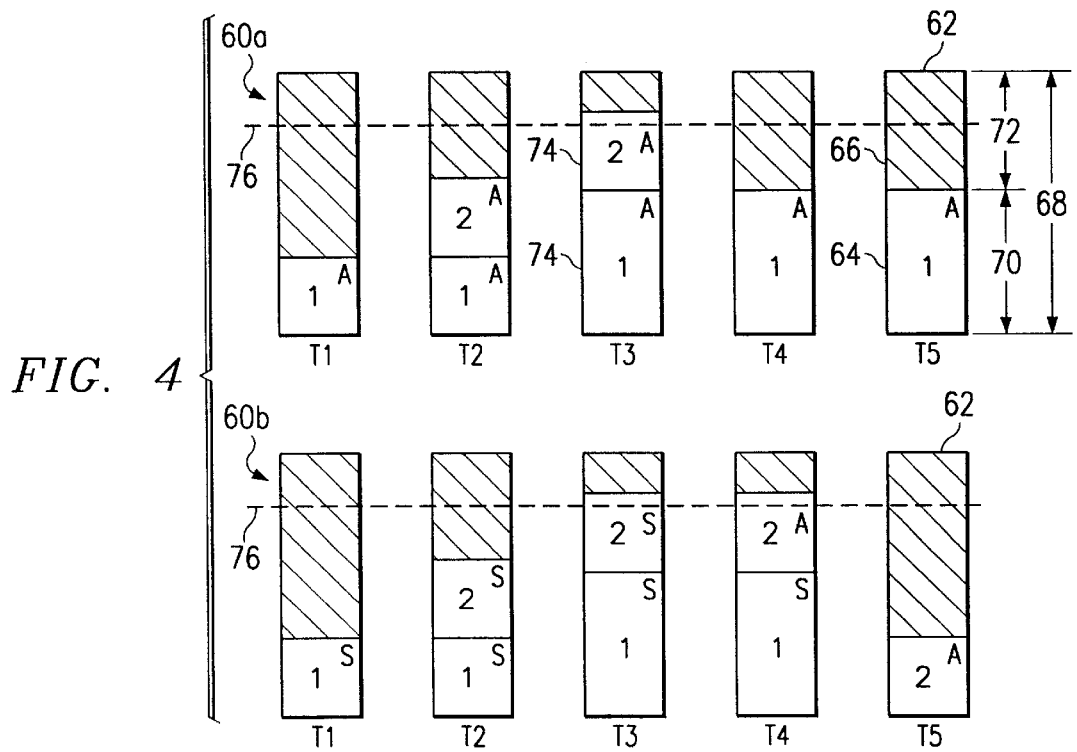
FIG. 3 illustrates a table that includes status information and resource information relating to the conferencing device.
FIG. 4 illustrates two bar graphs demonstrating the resource utilization of two DSPs over time.

FIG. 3 illustrates a table 40 that includes status information and resource information relating to conferencing device 10. The status information relates to the allocation of media conferences among DSPs 12 in conferencing device 10, and the resource information relates to the utilization of processing and memory resources by DSPs 12 to maintain the media conferences. As described above, SRM module 14 may store the status and resource information in memory 18. Although FIG. 3 illustrates a table for storing the status and resource information, SRM module 14 may store the status and resource information using any suitable data structures and may maintain associations between the data structures using arrays, linked lists, pointers, or any other suitable programming techniques.

A first column 42, a second column 44, a third column 46, and a fourth column 48 store status information relating to the allocation of media conferences to DSPs 12. First column 42 lists media conference identifiers for the media conferences allocated to DSPs 12. Using participant identifiers, second column 44 associates each media conference in first column 42 with the participants included in the media conference. In the illustrated embodiment, the participant identifiers are IP addresses (shown in dotted decimal notation) assigned to the participants' end-user devices 6. Using DSP identifiers, third column 46 associates each media conference in first column 42 with DSP 12 that processes the associated media conference in the active mode, and fourth column 48 associates each media conference in first column 42 with DSP 12 that processes the media conference in the stand-by mode. Fourth column 48 may also indicate if none of DSPs 12 process a media conference in the stand-by mode. Although the media conference identifiers and DSP identifiers are numbers and the participant identifiers are IP address in table 40, SRM module 14 may use numbers, letter, addresses, or any other suitable information to identify media conferences, conference participants, and DSPs 12 in conferencing device 10.

In operation, SRM module 14 uses the status information stored in table 40 to support the media conferences allocated to DSPs 12 and to de-allocate media conferences from DSPs 12. For example, when SRM module 14 receives input data packets, SRM module 14 may use the status information to communicate the input data packets to appropriate DSPs 12. In response to receiving an input data packet from interface 16, SRM module 14 may examine the data packet's source address, identify a conference participant associated with the source address using second column 44, identify DSPs 12 associated with the conference participant using third column 46 and fourth column 48, and communicate the input data packet to associated DSPs 12 for processing. In addition, SRM module 14 may use table 40 to select a media conference to de-allocate from one of DSPs 12. SRM module 14 may use either column 46 to select a media conference that DSP 12 is processing in the active mode or column 48 to select a media conference that DSP 12 is processing in the stand-by mode. If SRM module 14 selects a media conference that DSP 12 is processing in the active mode, SRM module 14 may use column 48 to ensure that another DSP 12 is processing the selected media conference in the stand-by mode. If another DSP 12 is not processing the media conference in the stand-by mode, SRM module 14 selects another media conference to de-allocate from DSP 12a In table 40, a fifth column 50 and a sixth column 52 store resource information relating to the resource utilization of DSPs 12. Fifth column 50 associates each media conference in first column 42 with processing information indicating an amount of processing resources, measured in MIPS, that each DSP 12 must devote to the associated media conference for the real-time processing of the media conference to appear transparent or near transparent to conference participants. Sixth column 52 associates each media conference in first column 42 with memory information indicating the percentage of memory 24 that each DSP 12 must devote to maintaining the associated media conference. Although table 40 includes only processing and memory information in FIG. 3, table 40 may include other information relating to any resources that affect the quality of service provided by DSPs 12.

As described above, SRM module 14 may allocate media conferences to DSPs 12 or de-allocate media conferences from DSPs 12 according to the resource information stored in table 40. Using fifth column 50, SRM module 14 may calculate to amount of processing resources that DSPs 12 are devoting to existing media conferences. For example, DSP 12 associated with identification number"1" is devoting 25 MIPS to media conference "1" and 70 MIPS to media conference "2" for a total of 95 MIPS. If SRM module 14 sets a resource threshold of 90 MIPS, then because 95 MIPS exceeds the resource threshold of 90 MIPS, SRM module 14 may de-allocate a media conference from DSP 12 to restore the resource buffer at DSP 12. In a similar manner, SRM module 14 may allocate media conferences to DSPs 12 or de-allocate media conferences from DSPs 12 according to the memory information stored in column 39. When SRM module 14 allocates a media conference to one of DSPs 12, de-allocates a media conference from one of DSPs 12, or changes the settings of a media conference, SRM module 14 modifies the status information and resource information in table 40.

FIG. 4 illustrates two bar graphs 60a and 60b demonstrating the resource utilization of DSPs 12a and 12b, respectively, over time. Bars 62 represent processing, memory, or other resources of DSPs 12a and 12b. Although bar graphs 60*a* and 60*b* include only a single measure of resource utilization, alternative embodiments may use different measures to separately represent processing, memory, or other resources that affect the quality of service provided by DSPs 12*a* and 12*b*. Each bar 62 is divided into a solid bar 64 and a hashed background 66. Solid bar 64 represents the portion of the resources devoted to processing existing media conferences, and hashed background 66 represents the portion of the resources available to support new media conferences or new participants in existing media conferences. At each identified time period, bar 62 has a height 68 indicating a total amount of resources, solid bar 64 has a height 70 indicating the amount of resources devoted to processing existing media conferences, and hashed background 66 has a height 72 indicating the amount of resources available to support new media conferences or new participants in existing media conferences.

Solid bars 64 are sub-divided into one or more segments 74 representing the portion of resources devoted to separate media conferences. In bar graphs 60*a* and 60*b*, segments 74 include numbers identifying separate media conferences and letters indicating whether DSP 12*a* and 12*b* are processing the media conferences in the active mode or the stand-by mode. An "A" in segments 74 indicates that associated DSP 12*a* or 12*b* is processing the identified media conference in the active mode, and a "S" in segments 74 indicates that associated DSP 12*a* or 12*b* is processing the identified media conference in the stand-by mode. Dotted lines 76 indicate resource thresholds. As described above, in a particular embodiment, if the amount of resources devoted to existing media conferences exceeds resource threshold 76, then SRM module 14 may de-allocate a media conference from associated DSP 12.

At time T1, SRM module 14 allocates a first media conference to DSPs 12*a* and 12*b* and sets the first media conference to the active mode in DSP 12*a* and the stand-by mode in DSP 12*b*. Bar graphs 60*a* and 60*b* indicate at time T1 that DSPs 12*a* and 12*b* are devoting a portion of their resources to processing the first media conference. At time T2, SRM module 14 allocates a second media conference to DSPs 12*a* and 12*b* and sets the second media conference to the active mode in DSP 12*a* and the stand-by mode in DSP 12*b*. As shown in bar graphs 60*a* and 60*b*, the amount of resources required to process the first and second media conferences is below resource thresholds 76.

At time T3, a new participant joins the first media conference. As a result of the additional participant, the amount of resources required to process the first and second media conferences allocated to DSPs 12*a* and 12*b* exceeds resource thresholds 76. To free resources at DSP 12*a*, SRM module 14 selects the second media conference to de-allocate from DSP 12*a*. Because the second media conference is set to the active mode in DSP 12*a* and the stand-by mode in DSP 12*b*, SRM module 14 sets the second media conference to the active mode in DSP 12*b* and de-allocates the second media conference from DSP 12*a*. Thus, at time T4, DSP 12*a* is processing only the first media conference, and the amount of resources devoted to the first media conference by DSP 12*a* is below resource threshold 76. As indicated in segment 74 associated with the second media conference, DSP 12*b* is processing the second media conference in the active mode.

The amount of resources required to process the first and second media conferences allocated to DSP 12*b* exceeds resource threshold 76. To free resources at DSP 12*b*, SRM module 14 selects the first media conference to de-allocate from DSP 12*b*. Because the first media conference is set to the active mode in DSP 12*a* and the stand-by mode in DSP 12*b*, SRM module 14 may de-allocate the first media conference from DSP 12*b* without changing the setting of the first media conference in DSP 12*a*. At time T5, DSP 12*a* is processing the first media conference in the active mode, and DSP 12*b* is processing the second media conference in the active mode. As a result, the amounts of resources devoted to the media conferences by DSP 12*a* and DSP 12*b* are below resource thresholds 56.

Figure 5A:
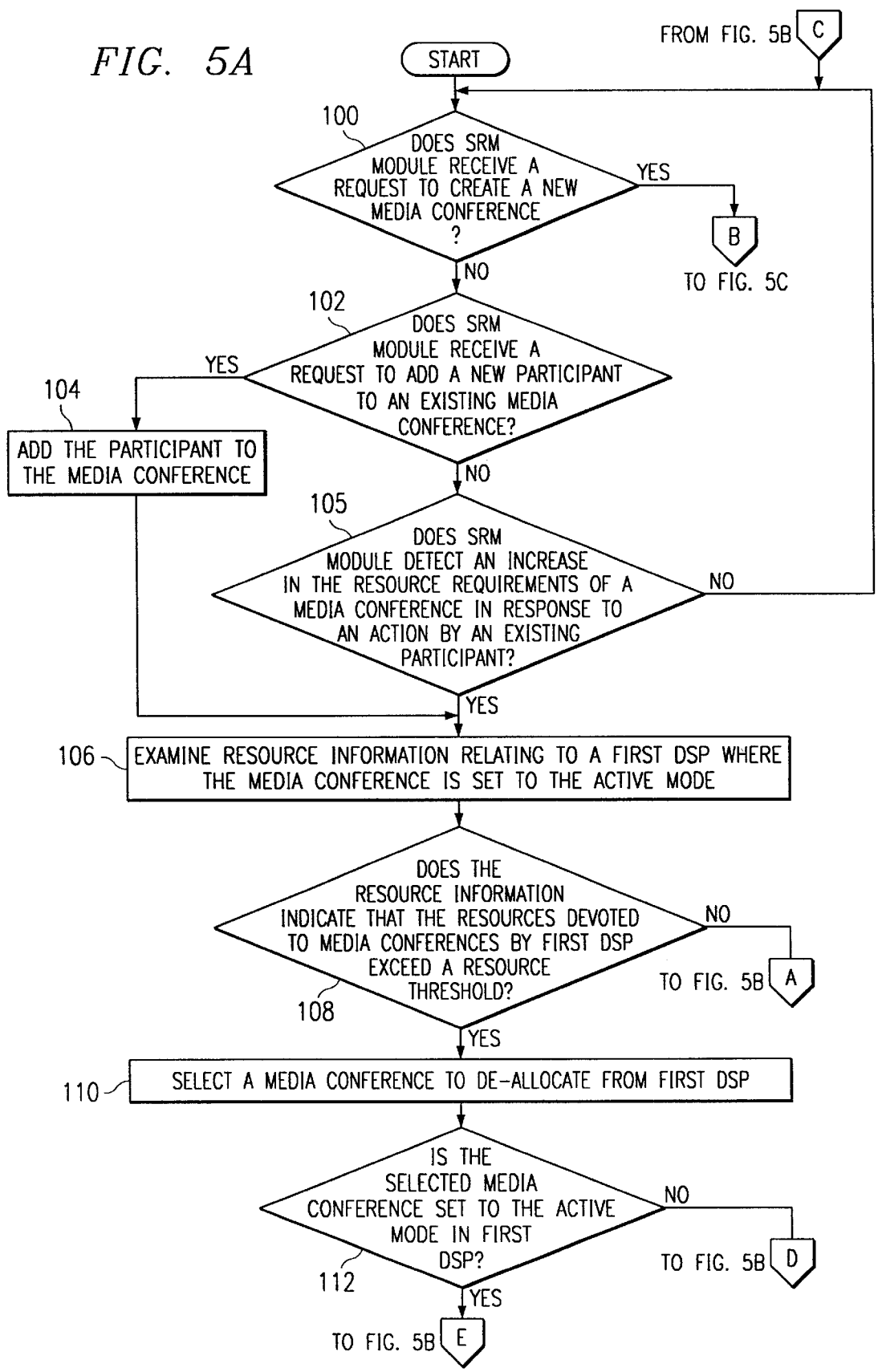

FIGS. 5A, 5B, and 5C is a flowchart illustrating a method of supporting media conferences using two or more DSPs 12. The method begins at step 100, where SRM module 14 may receive a request to create a new media conference. If SRM module 14 receives a request to create a new media conference, the method continues at step 134. If SRM module 14 receives a request to add a new participant to an existing media conference at step 102, SRM module 14 adds the new participant to the media conference at step 104. Because the resource requirements of the media conference increase due to the new participant, the method continues at step 106. Similarly, if SRM module 14 detects an increase in the resource requirements of a media conference in response to an action by an existing participant, the method continues at step 106.

At step 106, SRM module 14 examines resource information relating to a first DSP 12*a*, where the media conference is set to the active mode. At step 108, SRM module 14 determines whether the resource information indicates that the amount of resources devoted to media conferences by first DSP 12*a* exceeds a resource threshold. If the amount of resources devoted to media conferences does not exceed the resource threshold, then the method continues at step 118. Otherwise, to reduce the amount of resources devoted to media conferences by first DSP 12*a*, SRM module 14 selects a media conference to de-allocate from first DSP 12*a* at step 110. More specifically, SRM module 14 selects a media conference that is also allocated to another DSP 12. If the selected media conference is set to the active mode in first DSP 12*a*, SRM module 14 sets the media conference to the active mode in the other DSP 12 at step 114. SRM module 14 de-allocates the selected media conference from first DSP 12*a* at step 116.

At step 118, SRM module 14 determines whether the media conference with the increase in resource requirements is allocated to a second DSP 12*b*. If the media conference is not allocated to a second DSP 12*b*, the method returns to step 100. Otherwise, at step 122, SRM module 14 examines resource information relating to second DSP 12*b* and, at step 124, determines whether the resource information indicates that the amount of resources devoted to media conferences by second DSP 12*b* exceeds a resource threshold. If the amount of resources devoted to media conferences does not exceed the resource threshold, the method returns to step 100. Otherwise, to reduce the amount of resources devoted to media conferences by second DSP 12*b*, SRM module 14 selects a media conference to de-allocate from second DSP 12*b* at step 126. More specifically, SRM module 14 selects a media conference that is also allocated to another DSP 12. If the selected media conference is set to the active mode in second DSP 12*b*, SRM module 14 sets the media conference to the active mode in the other DSP 12 at step 130. SRM module 14 de-allocates the selected media conference from second DSP 12*b* at step 132. The method returns to step 100.

At step 134, SRM module 14 selects one of DSPs 12 to support the new media conference in the active mode. SRM module 14 examines resource information relating to selected DSP 12 at step 136. If the resource information does not indicate that selected DSP 12 has sufficient resources available to support the new media conference in active mode, SRM module 14 selects another DSP 12 to support the new media conference in the active mode at step 140, and the method returns to step 136. Otherwise, SRM module 14 allocates the new media conference to selected DSP 12 and sets the media conference to the active mode at step 142. SRM module 14 selects one of DSPs 12 to support the new media conference in the stand-by mode at step 144. SRM module 14 examines resource information relating to selected DSP 12 at step 146. If the resource information does not indicate that selected DSP 12 has sufficient resources available to support the new media conference in the stand-by mode, SRM module 14 selects another DSP 12 to support the new media conference in the stand-by mode at step 150, and the method returns to step 146. Otherwise, SRM module 14 allocates the new media conference to selected DSP 12 and sets the media conference to the stand-by mode at step 152, and the method returns to step 100.

Although the present invention has been described with several embodiments, a person skilled in the art could make various alterations, modifications, and additions without departing from the spirit and scope of the present invention as defined by the appended claims.

What is claimed is:

1. A device for supporting a plurality of media conferences, comprising:

a plurality of digital signal processors (DSPs), each DSP operable to receive input data packets from conference participants and to process the input data packets to generate output data packets, each DSP further operable to determine whether the media conference is set to an active mode and to communicate the output data packets to the conference participants in response to determining that the media conference is set to the active mode; and a system resource management (SRM) module coupled to the DSPs and operable to allocate a media conference to a first DSP and a second DSP and to set the media conference to the active mode in the first DSP and a stand-by mode in the second DSP, wherein the first DSP communicates output data packets associated with the media conference in response to the SRM module setting the media conference to the active mode in the first DSP, the SRM module further operable to set the media conference to the active mode in the second DSP and to de-allocate the media conference from the first DSP, wherein the second DSP communicates output data packets associated with the media conference in response to the SRM module setting the media conference to the active mode in the second DSP, wherein the second DSP further comprises:
a memory operable to store a status variable indicating whether the media conference is set to the active mode or the stand-by mode; and
a processing module coupled to the memory and operable to determine whether the media conference is set to the active mode by examining the status variable associated with the media conference in the memory.

2. A device for supporting a plurality of media conferences, comprising:

a plurality of digital signal processors (DSPs), each DSP operable to receive input data packets from conference participants and to process the input data packets to generate output data packets, each DSP further operable to determine whether the media conference is set to an active mode and to communicate the output data packets to the conference participants in response to determining that the media conference is set to the active mode; and a system resource management (SRM) module coupled to the DSPs and operable to allocate a media conference to a first DSP and a second DSP and to set the media conference to the active mode in the first DSP and a stand-by mode in the second DSP, wherein the first DSP communicates output data packets associated with the media conference in response to the SRM module setting the media conference to the active mode in the first DSP, the SRM module further operable to set the media conference to the active mode in the second DSP and to de-allocate the media conference from the first DSP, wherein the second DSP communicates output data packets associated with the media conference in response to the SRM module setting the media conference to the active mode in the second DSP, wherein the SRM module is further operable to de-allocate the first media conference from the first DSP if resource information relating to the first DSP exceeds a resource threshold.

3. A method of supporting a plurality of media conferences using a plurality of digital signal processors (DSPs), the method comprising:

allocating a media conference to a first DSP and a second DSP;

setting the media conference to an active mode in the first DSP and a stand-by mode in the second DSP;

communicating input data packets associated with the media conference to the first and second DSPs;

processing the input data packets to generate output data packets at the first and second DSPs;

determining whether the media conference is set to the active mode in the first and second DSPs;

communicating the output data packets from the first DSP to one or more end-user devices in response to determining that the media conference is set to the active mode in the first DSP;

de-allocating the media conference from the first DSP;

setting the media conference to the active mode in the second DSP; and communicating the output data packets from the second DSP to the end-user devices in response to determining that the media conference is set to the active mode in the second DSP.

4. A device for supporting a plurality of media conferences, comprising:

a system resource management (SRM) module operable to allocate a media conference to a first DSP and a second DSP and to set the media conference to an active mode in the first DSP and a stand-by mode in the second DSP, wherein the first DSP communicates one or more output data streams associated with the media conference to one or more end-user devices in response to the SRM module setting the media conference to the active mode in the first DSP, the SRM module further operable to deallocate the media conference from the first DSP and to set the media conference to the active mode in the second DSP, wherein the second DSP communicates one or more output data streams associated with the media conference to the end-user devices in response to the SRM module setting the media conference to the active mode in the second DSP, wherein the SRM module de-allocates the media conference from the first DSP if resource information relating to the first DSP exceeds a resource threshold.

5. System resource management (SRM) software embodied in a computer-readable medium and operable to perform the following steps:

allocating a media conference to a first DSP and a second DSP;

setting the media conference to an active mode in the first DSP and a stand-by mode in the second DSP;

communicating input data packets associated with the media conference to the first and second DSPs;

communicating output data packets from the first DSP to one or more end-user devices in response to setting the media conference to the active mode in the first DSP;

de-allocating the media conference from the first DSP;

setting the media conference to the active mode in the second DSP; and communicating the output data packets from the second DSP to the end-user devices in response to setting the media conference to the active mode in the second DSP.

6. The device of claim 1, wherein the SRM module stores status information relating to a plurality of media conferences, the status information associating each media conference with one or more DSPs that are processing each media conference in the active mode or the stand-by mode.

7. The device of claim 2, wherein the resource information relates to processing resources required to support one or more media conferences allocated to the first DSP.

8. The device of claim 2, wherein the resource information is based on a number of media conferences allocated to the first DSP and a number of participants in each media conference.

9. The device of claim 2, wherein the media conference is a voice telephone conference.

10. The method of claim 3, further comprising:

storing at the first DSP a status variable indicating whether the media conference allocated to the first DSP is set to the active mode; and storing at the second DSP a status variable indicating whether the media conference allocated to the second DSP is set to the active mode.

11. The method of claim 3, further comprising storing status information relating to the plurality of media conferences, the status information associating each media conference with one or more DSPs that are processing each media conference in the active mode or the stand-by mode.

12. The method of claim 3, further comprising:

examining resource information relating to the first DSP; and de-allocating the media conference from the first DSP if the resource information relating to the first DSP exceeds a resource threshold.

13. The method of claim 12, wherein the resource information relates to processing resources required to support one or more media conferences allocated to the first DSP.

14. The method of claim 12, wherein the resource information is based on a number of media conferences allocated to the first DSP and a number of participants in each media conference.

15. The method of claim 3, wherein the media conference is a voice telephone conference.

16. The device of claim 4, wherein the resource information relates to processing resources required to support one or more media conferences allocated to the first DSP.

17. The device of claim 4, wherein the resource information is based on a number of media conferences allocated to the first DSP and a number of participants in each media conference.

18. The device of claim 4, wherein the media conference is a voice telephone conference.

19. The SRM software of claim 5, further operable to perform the step of storing status information relating to a plurality of media conferences, the status information associating each media conference with one or more DSPs that are processing each media conference in the active mode or the stand-by mode.

20. The SRM software of claim 5, further operable to perform the steps of:

examining resource information relating to the first DSP; and de-allocating the media conference from the first DSP if the resource information relating to the first DSP exceeds a resource threshold.

21. The SRM software of claim 20, wherein the resource information relates to processing resources required to support one or more media conferences allocated to the first DSP.

22. The SRM software of claim 20, wherein the resource information is based on a number of media conferences allocated to the first DSP and a number of participants in each media conference.

23. The SRM software of claim 5, wherein the media conference is a voice telephone conference.

24. The SRM module of claim 4, wherein the SRM stores in a memory status information relating to a plurality of media conferences, the status information associating each media conference with one or more DSPs that process each media conference in the active mode or the stand-by mode.

* * * * *